US012603481B2

(12) United States Patent
Gajendra et al.

(10) Patent No.: US 12,603,481 B2
(45) Date of Patent: *Apr. 14, 2026

(54) SMART AIR IONIZER

(71) Applicant: B/E Aerospace, Inc., Winston Salem, NC (US)

(72) Inventors: Hemanth Raghav Gajendra, Bangalore (IN); Srinivas Magaji Gundu, Bangalore (IN); Skandan Berikai Kuppan, Bangalore (IN); Matthew R. Pearson, Hartford, CT (US); Shashikiran Soodlu, Bangalore (IN); Ashwin Rajamony, Belgaum (IN)

(73) Assignee: B/E AEROSPACE, INC., Winston Salem, NC (US)

( * ) Notice: Subject to any disclaimer, the term of this patent is extended or adjusted under 35 U.S.C. 154(b) by 137 days.

This patent is subject to a terminal disclaimer.

(21) Appl. No.: 18/401,090

(22) Filed: Dec. 29, 2023

(65) Prior Publication Data

US 2025/0149865 A1     May 8, 2025

(30) Foreign Application Priority Data

Nov. 3, 2023    (IN) .............................. 202341075178

(51) Int. Cl.
H01T 23/00        (2006.01)
B03C 3/38         (2006.01)
(Continued)

(52) U.S. Cl.
CPC ............... H01T 23/00 (2013.01); B03C 3/38 (2013.01); B03C 3/68 (2013.01); B64D 13/06 (2013.01);
(Continued)

(58) Field of Classification Search
None
See application file for complete search history.

(56) References Cited

U.S. PATENT DOCUMENTS

| | | | |
|---|---|---|---|
| 4,493,247 A | | 1/1985 | Wachsman |
| 5,116,583 A | * | 5/1992 | Batchelder .............. H01T 23/00 |
| | | | 361/231 |

(Continued)

FOREIGN PATENT DOCUMENTS

| | | |
|---|---|---|
| EP | 0944941 | 9/2002 |
| EP | 3752209 | 12/2020 |
| IN | 202017034614 | 9/2020 |

OTHER PUBLICATIONS

European Patent Office, European Search Report dated Mar. 12, 2025 in Application No. 24207616.4.

(Continued)

*Primary Examiner* — Stephen W Jackson
(74) *Attorney, Agent, or Firm* — SNELL & WILMER L.L.P.

(57)        ABSTRACT

A smart air ionizer is disclosed herein. The smart air ionizer includes a power circuit, a high voltage circuit, an electrode coupled to the high voltage circuit, the electrode configured to ionize air surrounding the electrode, and a controller circuit coupled to the power circuit and the high voltage circuit, the controller circuit including a controller configured to control a voltage output of the high voltage circuit to the electrode based on a feedback received from the high voltage circuit.

19 Claims, 8 Drawing Sheets

(51) Int. Cl.
    *B03C 3/68*         (2006.01)
    *B64D 13/06*      (2006.01)

(52) U.S. Cl.
    CPC .... *B03C 2201/30* (2013.01); *B64D 2013/067*
                                  (2013.01)

(56) References Cited

U.S. PATENT DOCUMENTS

| | | | |
|---|---|---|---|
| 5,648,046 A | 7/1997 | Weibel | |
| 6,693,788 B1 * | 2/2004 | Partridge | H01T 23/00 |
| | | | 361/231 |
| 7,300,499 B1 | 11/2007 | Reisher | |
| 9,199,248 B2 | 12/2015 | Au et al. | |
| 9,216,827 B2 | 12/2015 | Au et al. | |
| 10,128,075 B2 | 11/2018 | Waddell | |
| 10,317,096 B2 | 6/2019 | Waddell et al. | |
| 10,383,970 B2 | 8/2019 | Waddell | |
| D868,233 S | 11/2019 | Galbreath et al. | |
| 10,710,123 B2 | 7/2020 | Waddell et al. | |
| 10,786,818 B2 * | 9/2020 | Galbreath | B03C 3/41 |
| 10,974,256 B1 | 4/2021 | Galbreath et al. | |
| 2004/0118428 A1 * | 6/2004 | Stelcher | B65D 83/182 |
| | | | 134/1 |
| 2007/0210734 A1 | 9/2007 | Botvinnik et al. | |
| 2008/0158768 A1 | 7/2008 | Yamashita et al. | |
| 2015/0165084 A1 | 6/2015 | Waddell et al. | |
| 2018/0193509 A1 | 7/2018 | Bender et al. | |
| 2020/0388994 A1 | 12/2020 | Waddell et al. | |
| 2023/0160586 A1 | 5/2023 | Mowris et al. | |
| 2024/0400209 A1 * | 12/2024 | Shekar | B64D 13/06 |

OTHER PUBLICATIONS

Singh, R.K., "Airlines see sharply lower losses in 2022", recovery in sight. Reuters.Oct. 2021. https://www.reuters.com/business/aerospace-defense/iata-sees-sharp-fall-airline-losses-2022-2021-10-04/.

Kitching, "Passenger jet forced to divert because of 'extremely pungent' smell coming from toilet". Mirror UK, Mar. 6, 2017, https://www.mirror.co.uk/news/weirdnews/passenger-jet-forced-divertbecause-9978146, 3 pages.

"BA flight forced to land early because of smelly poo", BBC News, Mar. 16, 2015, https://www.bbc.com/news/newsbeat-31908620, pp. 1-3.

Hester, E. "Smaller airplane bathrooms? That really stinks" Los Angeles Times. Sep. 2019.https://www.latimes.com/travel/story/2019-09-04/fly-guy-small-stinky-bathrooms.

Pavia, "Germs on a Plane: Aircraft, International Travel, and the Global Spread of Disease", The Journal of Infectious Diseases, vol. 195, Issue 5, Mar. 1, 2007, pp. 621-622, https://doi.org/10.1086/511439.

"Aviation Clean Air (Aca) Ionization System for Bombardier Global and Challenger Aircraft", Duncan Aviation, Apr. 2021, https://www.duncanaviation.aero/intelligence/2021/April/aviation-clean-air-acaionization-system-for-bombardier-global-and-challenger-aircraft, 2 pages.

Global Plasma Solutions, "Better Air through Science", 2020, https://www.sde.idaho.gov/communications/files/public-records-requests/GPSPresentation.pdf, 55 pages.

"This chart shows how airlines are being grounded by COVID-19." Mar. 2020. World Economic Forum. https://www.weforum.org/agenda/202 0/03/this-chart-shows-how-airlines-are-being-grounded-by-covid-19/.

* cited by examiner

800

802 Receive Sensor Inputs

804 Within Limits?

806 Retry

No

Yes

808 Receive Ion Count

810 Ion count < Expected?

Yes

No

812 Determine Voltage Feedback Modifier

814 Receive Voltage Feedback

816 Send Voltage Modifier to HV Generator

SMART AIR IONIZER

CROSS-REFERENCE TO RELATED APPLICATIONS

This application claims priority to, and the benefit of, India Provisional Patent Application No. 202341075178, filed Nov. 3, 2023 and titled "SMART AIR IONIZER," (DAS Code CD70) which is incorporated by reference herein in its entirety for all purposes.

FIELD

The present disclosure generally relates to systems for managing air quality in an aircraft, and more specifically, to using air ionizers in an aircraft.

BACKGROUND

Travel within aircraft includes the recirculation of air within the aircraft. Circulation of air within an enclosed space, such as aircraft, may include circulation of harmful pathogens (e.g., viruses, bacteria, etc.) and undesirable odors. Currently, commercial aircraft use air filters, including high efficiency particulate air (HEPA) filters, to filter the air during recirculation. Generally, air filters are placed at central locations and therefore may not have continuous effectiveness within the enclosed space. Furthermore, more effective air filters, such as HEPA filters, come with an increased cost both in terms of the filter itself as well as the energy used to force air through the air filter. Furthermore, air filters, including HEPA filters, do not remove odors from the air within the enclosed space.

SUMMARY

A smart air ionizer is disclosed herein. The smart air ionizer includes a power circuit, a high voltage circuit, an electrode coupled to the high voltage circuit, the electrode being exposed to an airflow to ionize the air in the airflow, and a controller circuit coupled to the power circuit and the high voltage circuit, the controller circuit including a controller configured to control a voltage output of the high voltage circuit to the electrode based on a feedback received from the high voltage circuit.

In various embodiments, the smart air ionizer further includes an ion probe connected to the controller, wherein the controller is configured to receive and ion count from the ion probe and control the voltage output of the high voltage circuit based on the ion count. In various embodiments, the feedback includes a voltage feedback, wherein the controller is further configured to determine a voltage modifier based on the voltage feedback. In various embodiments, the feedback includes a current feedback, wherein the controller is further configured to determine a current modifier based on the current feedback.

In various embodiments, the high voltage circuit further includes a high voltage controller coupled to the controller, wherein the high voltage controller is configured to receive input from the controller and provide output to the switching regulator in response to the received input. In various embodiments, the controller further configured to provide the feedback to the power circuit. In various embodiments, the controller is further configured to receive input from a keyboard interface and provide output to a display.

Also disclosed herein is a passenger service unit for use above an airline seat. The passenger service unit includes a body, an air outlet mounted to the body, an electrode mounted adjacent the air outlet, the electrode configured to ionize air surrounding the electrode in response to receiving a high voltage, an air ionizer circuit connected to the electrode, the air ionizer circuit configured to output the high voltage, a processor coupled to the air ionizer circuit, and a memory operatively coupled to the processor. The memory includes instructions stored thereon that, when executed by the processor, cause the processor to receive a voltage feedback from the air ionizer circuit, determine a voltage modifier based on the voltage feedback, and send the voltage modifier to adjust the high voltage.

In various embodiments, the passenger service unit further includes an air duct disposed within the body, where a first end of the air outlet is connected to the air duct and a second end of the air outlet is exposed outside of the body, wherein the electrode is disposed adjacent the first end of the air outlet. In various embodiments, the passenger service unit further includes a power circuit connected to the air ionizer circuit and a high voltage circuit connected to the air ionizer circuit and the electrode. In various embodiments, the high voltage circuit generates the high voltage and a low current, the high voltage being about 5 KV to about 10 KV, and the low current being less than 1 mA.

In various embodiments, the passenger service unit further includes a probe configured to measure a number of ions generated by the electrode. The instructions, when executed by the processor, further cause the processor to receive an input from the probe and update the voltage modifier in response to the number of ions being below an ion threshold. In various embodiments, the instructions, when executed by the processor, further cause the processor to receive a measurement from the power circuit and determine to retry startup of the power circuit and the air ionizer circuit in response to the measurement being outside of a predetermined limit. In various embodiments, the instructions, when executed by the processor, further cause the processor to receive an indication to change a predetermined high voltage output, receive feedback including the high voltage, and adjust the high voltage based on the feedback and the predetermined high voltage output.

Also disclosed herein is a method for controlling an air ionizer. The method includes receiving, by a processor, an ion count from a probe, the ion count being representative of ions produced by an electrode, comparing, by the processor, the ion count to an ion threshold, receiving, by the processor, a voltage feedback from a feedback circuit, and sending, by the processor, a voltage modifier to a high voltage generator, the voltage modifier based on the voltage feedback.

In various embodiments, the method further includes determining, by the processor, that the ion count is below the ion threshold and adjusting, by the processor, the voltage modifier in response to the ion count being below the ion threshold. In various embodiments, the method further includes receiving, by the processor, an input to change the ion threshold and sending, by the processor, the voltage modifier in response to the change in the ion threshold.

In various embodiments, the method further includes before receiving the ion count, receiving, by the processor, power sensor inputs and determining, by the processor, to continue running in response to the power sensor inputs being within a predetermined voltage limit. In various embodiments, the sending the voltage modifier results in an increase in a number of ions generated by the electrode. In various embodiments, the sending the voltage modifier results in a decrease in a number of ions generated by the electrode.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
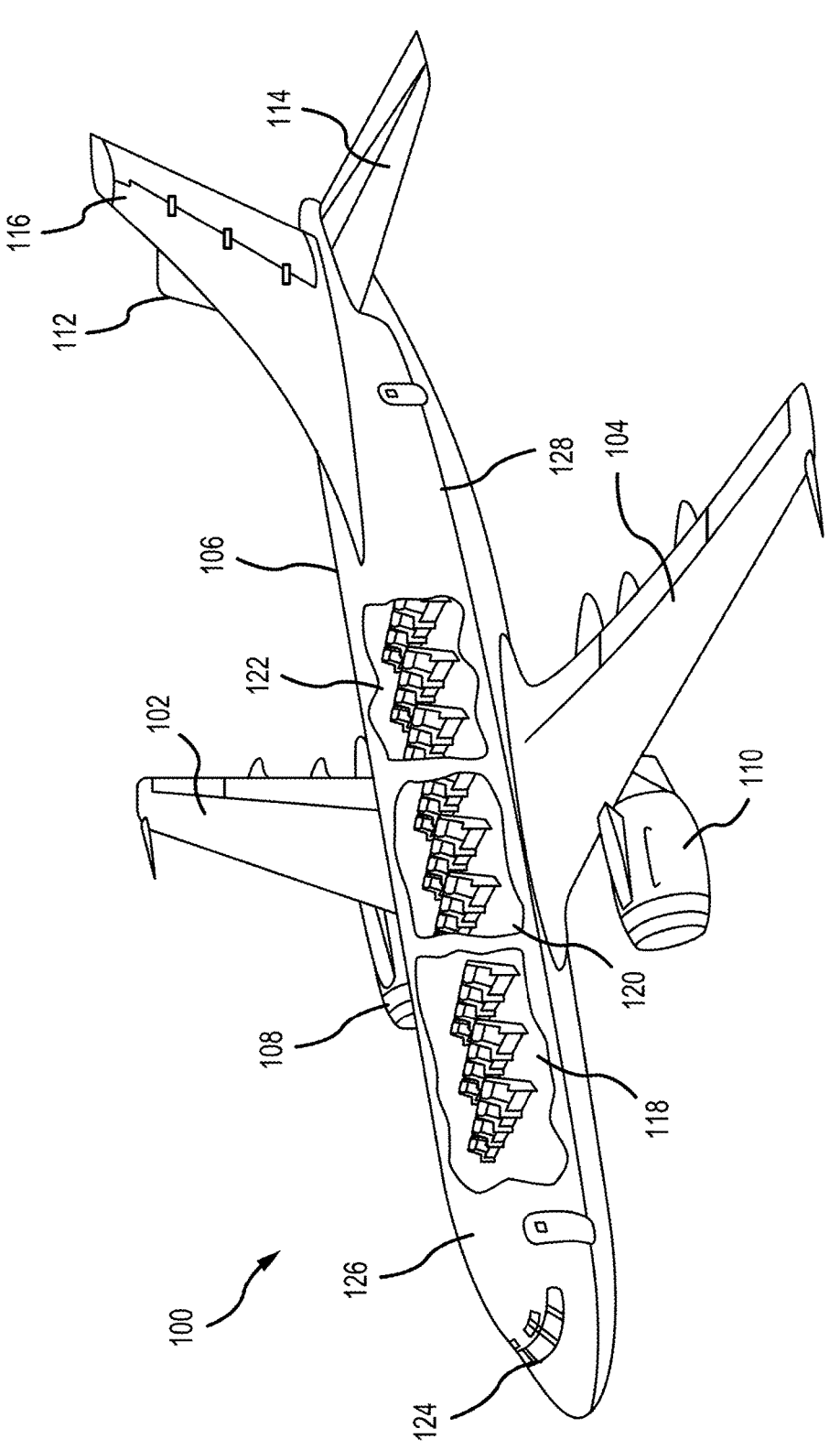
FIG. 1 illustrates an aircraft and various sections within the aircraft, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a smart air ionizer with the dual capability of neutralizing pathogens (e.g., bacteria, viruses, molds, etc.) and neutralizing undesirable odors (e.g., volatile organics, sulfur-based compounds, etc.). In various embodiments, the smart air ionizer may be used alongside existing air filters. In various embodiments, a high efficiency particulate air (HEPA) filter for improved performance. In various embodiments, the combination of the smart air ionizer and the air filter may perform at a higher minimum efficiency reporting value (MERV) rating than the MERV rating of the air filter. Accordingly, a non-HEPA filter paired with the smart air ionizer may perform with a higher MERV value than a HEPA filter. In various embodiments, the smart air ionizer ionizes the surrounding air, generating positive and negative ions. The positive and negative ions combine with pathogens and odor molecules in the air and effectively neutralizes both.

In various embodiments, the smart air ionizer may be placed in the cabin of an aircraft. In various embodiments, the smart air ionizer may be placed in the lavatories of the aircraft. In various embodiments, the smart air ionizer may be placed adjacent to air vents in the cabin and lavatories of the aircraft. In various embodiments, the smart air ionizer may be joined with the air vent and/or placed inside the air vent to improve efficiency. In various embodiments, the smart air ionizer may control a number of ions produced as measured in a count of ions per time. In various embodiments, the smart air ionizer may include a feedback mechanism to ensure proper operation under different conditions. In various embodiments, the smart air ionizer may detect degradation of the ionizer (e.g., age, debris, etc.) and alert crew members. In various embodiments, the smart air ionizer may tend to reduce or eliminate the amount of ozone produced, allowing the smart air ionizer to be placed in enclosed spaces.

Referring now to FIG. 1, an aircraft 100 and various sections within the aircraft is illustrated, in accordance with various embodiments. Aircraft 100 is an example of a passenger or transport vehicle in which smart air ionizers may be implemented in accordance with various embodiments. In various embodiments, aircraft 100 has a starboard wing 102 and a port wing 104 attached to a fuselage 106. In various embodiments, aircraft 100 also includes a starboard engine 108 connected to starboard wing 102 and a port engine 110 connected to port wing 104. In various embodiments, aircraft 100 also includes a starboard horizontal stabilizer 112, a port horizontal stabilizer 114, and a vertical stabilizer 116. In various embodiments, aircraft 100 also includes various cabin sections, including, for example, a first cabin section 118, a second cabin section 120, a third cabin section 122, and a pilot cabin 124. In various embodiments, aircraft 100 may include a front lavatory 126 and/or a rear lavatory 128.

Figure 2:
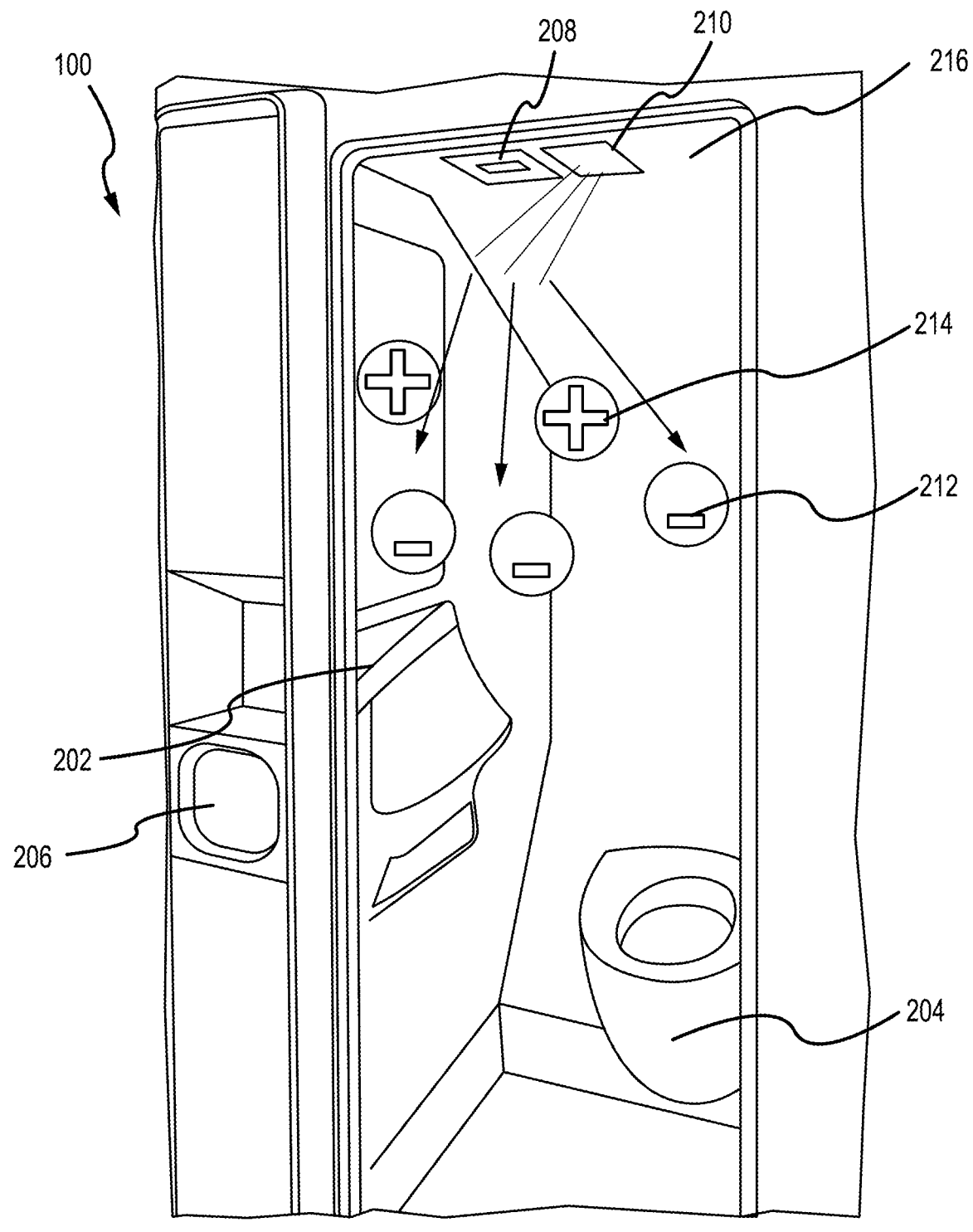
FIG. 2 illustrates a lavatory in an aircraft with a smart air ionizer, in accordance with various embodiments.

Referring now to FIG. 2, a lavatory 200 is illustrated, in accordance with various embodiments. In various embodiments, lavatory 200 may be an example of front lavatory 126 or rear lavatory 128. Lavatory 200 may include a sink 202, a toilet 204, a trash receptacle 206, an air vent 208, and an air ionizer 210. In various embodiments, air ionizer 210 may be mounted on ceiling 216 of lavatory 200, adjacent air vent 208. In various embodiments, air ionizer 210 may be mounted within air vent 208. Air ionizer 210 generates ionized air particles, including negative ions 212 and positive ions 214, that are spread throughout lavatory 200 by air flow from air vent 208.

In various embodiments, air ionizer 210, and more specifically, positive ions 214 may neutralize pathogens (e.g., bacteria, viruses, molds, dust, etc.) and/or malodor (i.e., unpleasant smells) that are airborne and on surfaces. Pathogens and malodor may be generated and/or spread by sink 202, toilet 204, and trash receptacle 206, among other locations. Pathogens and malodor may be airborne and/or settle on surfaces within lavatory 200, including sink 202, toilet 204, and trash receptacle 206, among others.

As illustrated in FIG. 2, air ionizer 210 may be placed adjacent air vent 208 so that air ionizer 210 ionizes the air exiting air vent 208. Generally, ions created by air ionizer 210, such as negative ions 212 and positive ions 214, have an active life span of about 30 seconds to about 75 seconds, and more specifically, about 45 seconds to about 60 seconds. Accordingly, locating air ionizer 210 adjacent air vent 208 improves the efficacy of negative ions 212 and positive ions 214 as compared to placing an air ionizer within ductwork of an air handling system or adjacent an air filter within the air handling system. In various embodiments, air ionizer 210 may be placed inside air vent 208, and more specifically, within the ductwork behind air vent 208 and immediately adjacent air vent 208. In various embodiments, air ionizer 210 may be incorporated into air vent 208 so the air ionizer 210 and air vent 208 operate as a single unit to ionize and disperse air throughout lavatory 200.

Figure 3:
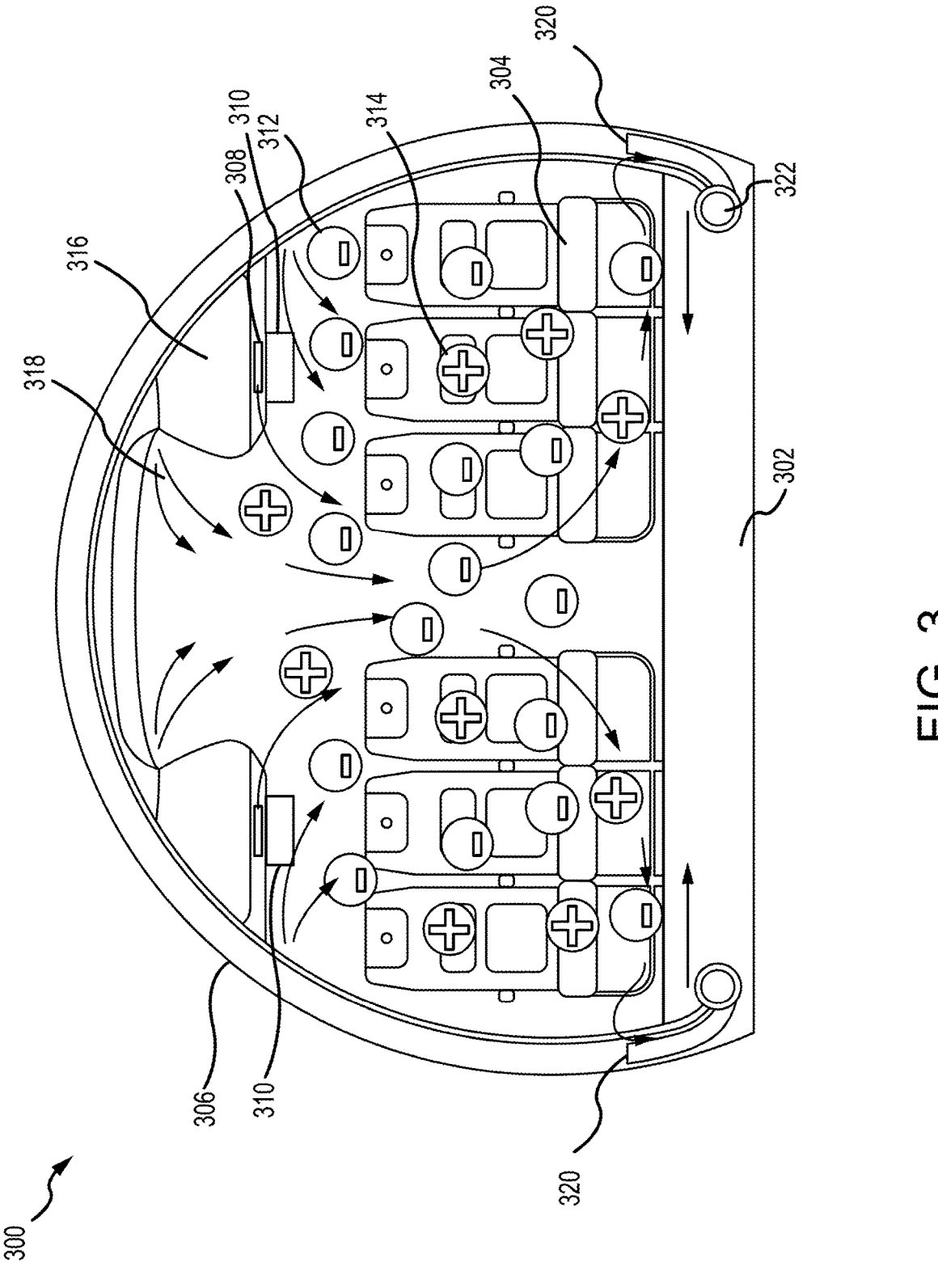
FIG. 3 illustrates a cabin area in an aircraft with a smart air ionizer system, in accordance with various embodiments.

Referring now to FIG. 3, a cabin 300 of an aircraft (e.g., aircraft 100) is illustrated, in accordance with various embodiments. Cabin 300 may be an example of first cabin section 118, second cabin section 120, and/or third cabin section 122. Cabin 300 includes a floor 302, one or more rows of seats 304 mounted to floor 302, a fuselage 306 surrounding cabin 300 to form outer walls and ceiling of cabin 300, and overhead bins 316 that are mounted to fuselage 306. Cabin 300 further includes passenger air outlets 308 are mounted underneath overhead bins 316 and above one or more passenger seats 304. In various embodiments, air outlet 308 may be an air grasper that is commonly placed above passenger seats 304 and is adjustable by rotating a nozzle on the air grasper. In various embodiments, there may be one passenger air outlet 308 for each passenger seat 304. Cabin 300 further includes cabin air outlets 318 that blow, or provide, air from above overhead bins 316. Air in cabin 300 is circulated (as indicated by the arrows) from passenger air outlets 308 and cabin air outlets 318 throughout cabin 300, including over and around, seats 304, and into one or more air returns 320. In various embodiments, air may circulate through air ducts 322 and through air filters before returning into cabin 300 through passenger air outlets 308 and cabin air outlets 318.

As illustrated in FIG. 3, air ionizer 310 is placed adjacent passenger air outlet 308 to ionize the air as it exits passenger air outlet 308. In various embodiments, there may be one air ionizer 310 for each passenger air outlet 308. In various embodiments, there may be one air ionizer 310 for each row of passenger seats 304, where each passenger seat 304 is associated with one passenger air outlet 318. In various embodiments, one or more air ionizers 310 may be placed adjacent cabin air outlets 318. In various embodiments, air ionizer 310 may be placed inside air system ductwork adjacent passenger air outlet 308 and cabin air outlet 318. In various embodiments, air ionizer 310 may be incorporated into a passenger service unit (PSU) within cabin 300.

Figure 4B:
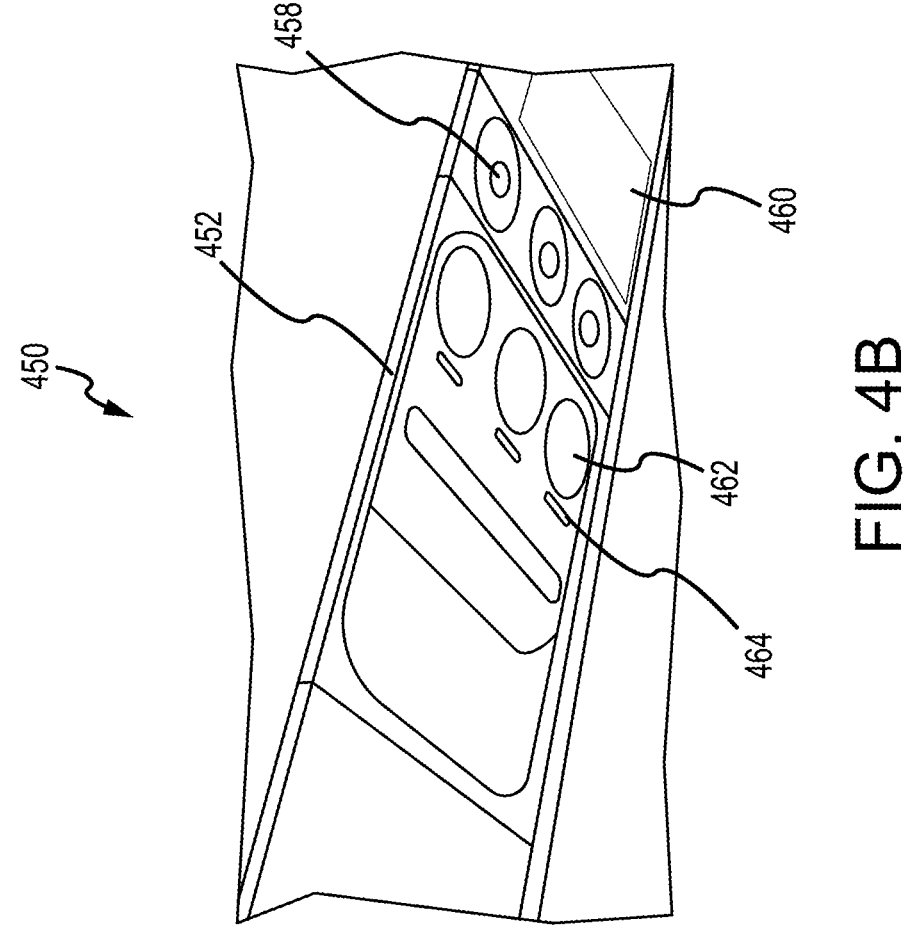
FIGS. 4A and 4B illustrate a smart air ionizer install in an aircraft, in accordance with various embodiments.
Figure 4A:
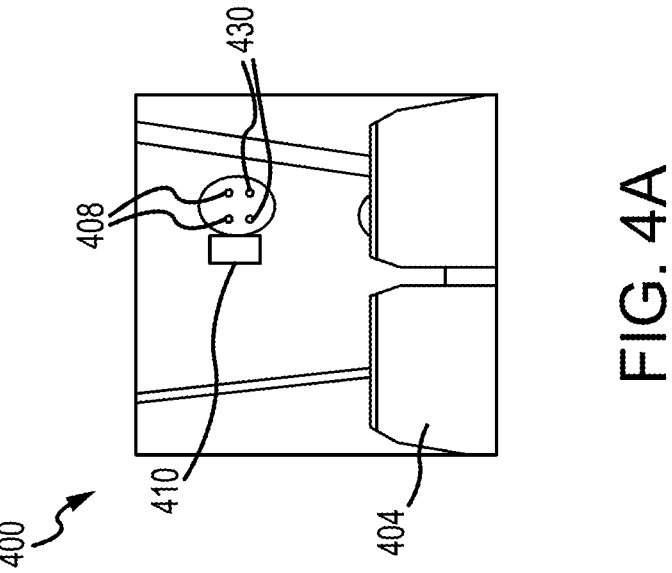

Referring now to FIGS. 4A and 4B, illustrated are a passenger service unit (PSU) 400 and PSU 450 that may be used in an aircraft cabin (e.g., cabin 300), in accordance with various embodiments. FIG. 4A illustrates PSU 400 above two passenger seats 404, PSU 400 including two passenger air outlets 408, an air ionizer 410, and two reading lights 430. As illustrated, air ionizer 410 is located on PSU 400 and adjacent passenger air outlets 408. Placing air ionizer 410 adjacent passenger air outlets 408 improves the performance of air ionizer 410 by increasing the amount of time the ions created by air ionizer 410 are circulated through cabin 300.

In various embodiments, air ionizer 410 may be located inside PSU 400 and adjacent passenger air outlets 408. Placing air ionizer 410 inside PSU 400 may be more visually appealing with little to no degradation in the performance of air ionizer 410. In various embodiments, PSU 400 may be installed above a two seat aisle in an aircraft.

FIG. 4B illustrates PSU 450 including a body 452 that includes three passenger air outlets 458, an air ionizer 460, three passenger reading lights 462, and three call buttons 464. Air ionizer 460 is placed on the outside body 452 adjacent the three passenger air outlets 458 to provide improved ionizing performance. In various embodiments, air ionizer 460 may be placed inside body 452 and adjacent passenger air outlets 458 with little to no degradation in performance of air ionizer 410. In various embodiments, PSU 450 may be installed above a three seat aisle in an aircraft.

Figure 5:
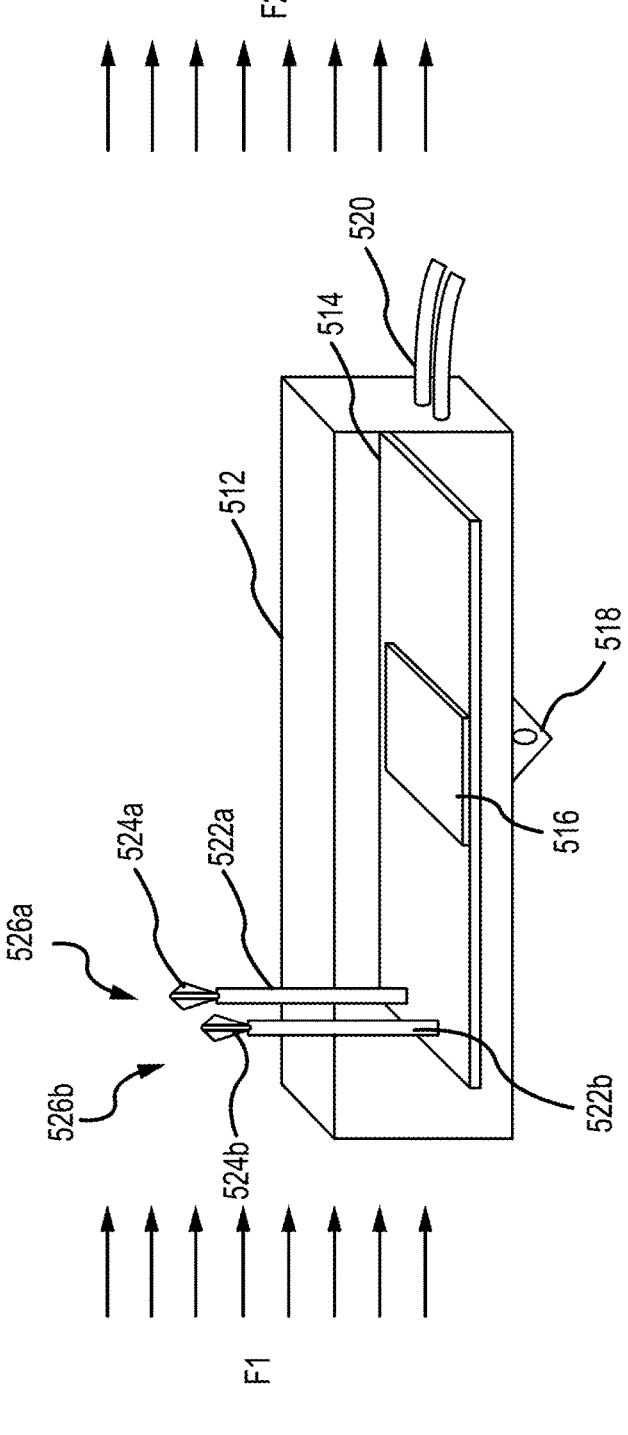
FIG. 5 illustrates a perspective view of a smart air ionizer unit, in accordance with various embodiments.

Referring now to FIG. 5, illustrated is a smart air ionizer 510, in accordance with various embodiments. Smart air ionizer 510 may be an example of air ionizer 210 described above with respect to FIG. 2, air ionizer 310 described above with respect to FIG. 3, air ionizer 410 described above with respect to FIG. 4A, or air ionizer 460 described above with respect to FIG. 4B. Smart air ionizer 510 includes an enclosure 512, an air ionizer circuit 514, a high voltage circuit 516, a mounting flange 518, and an input power cable 520. High voltage circuit 516 is connected to air ionizer circuit 514 and both are disposed within enclosure 512. In various embodiments, enclosure 512 may mounted to a ceiling (e.g., ceiling 216), a wall, a passenger service unit (e.g., PSU 400, PSU 450), or an air duct, among other locations. In various embodiments, mounting flange 518 may be used to secure enclosure 512 to the surface on which it is mounted.

Smart air ionizer 510 further includes a first high voltage wire 522a, a second high voltage wire 522b, a first carbon brush 524a, and a second carbon brush 524b. First high voltage wire 522a is connected to air ionizer circuit 514 at a first end and to first carbon brush 524a at a second end. First high voltage wire 522a and first carbon brush 524a may be collectively referred to as a first electrode 526a. Second high voltage wire 522b is connected to air ionizer circuit 514 at a first end and to second carbon brush 524b at a second end. Second high voltage wire 522b and second carbon brush 524b may be collectively referred to as a second electrode 526b. Also illustrated are an air flow F1 into smart air ionizer 510 and an ionized air flow F2 out smart air ionizer 510.

Input power cable 520 provides power for smart air ionizer 510. In various embodiments, input power cable 520 may provide 115 VAC. In various embodiments, input power cable 520 may provide 28 VDC. In various embodiments, another AC or DC voltage may be provided. Power provided by input power cable 520 may be used to power air ionizer circuit 514 and high voltage circuit 516.

Air ionizer circuit 514 includes a controller that is configured to control the various features and elements of the smart air ionizer. Air ionizer circuit 514 may be configured for use with various external high voltage ranges and electrode types (e.g., first and second high voltage wires 522a, 522a and first and second carbon brushes 524a, 524b). The controller may include one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof. The controller may further include memory to store data, executable instructions, system program instructions, and/or controller instructions to implement the control logic of the controller.

High voltage circuit 516 may include a switching regulator, a transformer, and a passive voltage tripler. In various embodiments, high voltage circuit 516 may receive input voltage from input power cable 520. In various embodiments, high voltage circuit 516 may output about 2.5 KV to about 12.5 KV, and more specifically, about 5 KV to about 10 KV. In various embodiments, the controller in air ionizer circuit 514 may control high voltage circuit 516. In various embodiments, the controller in air ionizer circuit 514 may control the output voltage of high voltage circuit 516. In various embodiments, an output current of high voltage circuit 516 may be limited to microamps.

The high voltage output of high voltage circuit 516 is sent to first electrode 526a and second electrode 526b. That is, the high voltage is sent to first high voltage wire 522a and second high voltage wire 522b and subsequently to first carbon brush 524a and second carbon brush 524b, respectively. Together, first electrode 526a and second electrode 526b use the high voltage output of high voltage circuit 516 to ionize the air surrounding first carbon brush 524a and second carbon brush 524b, respectively. Air ionizer circuit 514, and more specifically, the controller of air ionizer circuit 514 controls the voltage and current sent to first and second electrodes 526a, 526b. By limiting the current to microamps, first and second electrodes 526a, 526b produce no ozone when ionizing the surrounding air. Generally, the process of adding electrical charge to the air, that is generating ions, generally causes free oxygen molecules to form ozone. By limiting the current to less than 1 mA, and more specifically, less than 100 µA, smart air ionizer 510 operates in reduces electrical charge in the air resulting in no ozone production.

Figure 6:
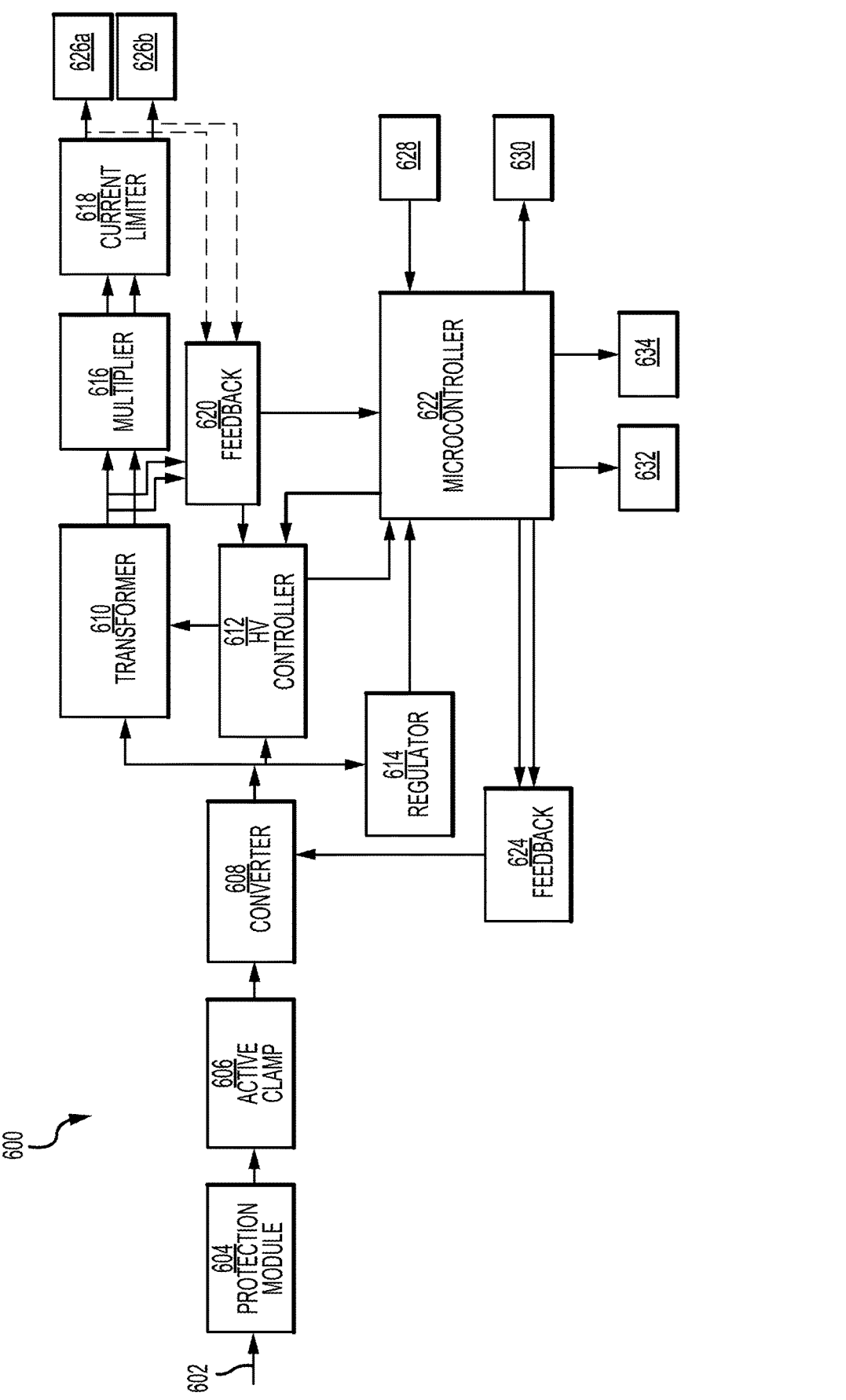
FIG. 6 illustrates a system diagram of a smart air ionizer, in accordance with various embodiments.

Referring now to FIG. 6, a diagram of system 600 of an air ionizer circuit is illustrated, in accordance with various embodiments. System 600 may be an example of air ionizer circuit 514 and high voltage circuit 516 described above with respect to FIG. 5. System 600 includes a power input 602, a protection module 604, an active clamp 606, and a converter 608, which may be collectively referred to as a power circuit. In various embodiments, power input 602 may provide 18 VDC to 32 VDC, and more specifically, may provide 28 VDC to system 600. In various embodiments, power input 602 may provide 110 VAC to 240 VAC, and more specifically, may provide 115 VAC to system 600. In various embodiments, system 600 may optionally include an AC-DC converter to convert AC voltage input to DC voltage. In various embodiments, protection module 604 may provide electrostatic discharge (ESD) and/or surge protection for system 600. In various embodiments, active clamp 606 may provide protection for the power supply (e.g., power input 602) against back electric and magnetic fields (EMF). In various embodiments, converter 608 may be a DC-DC voltage converter. In various embodiments, converter 608 may be a buck-boost converter to step-down DC voltage or step-up DC voltage.

System 600 further includes a transformer 610, a high voltage controller 612, a regulator 614, a multiplier 616, a current limiter 618, a feedback circuit 620, a controller 622, a feedback switch 624, a first electrode 626a, and a second electrode 626b. In various embodiments, transformer 610 may be an isolation transformer driver that provides separation from power input 602 and high voltage controller 612 first and second electrodes 626a, 626b. In various embodiments, transformer 610 may receive a voltage from converter 608 to be provided to multiplier 616. In various embodiments, multiplier 616 may multiply, or step-up, the voltage provided by transformer 610 to a high voltage for use by first and second electrode 626a, 626b. Multiplier 616 provides the high voltage to current limiter 618 that the supplies the high voltage and limited current to first and second electrode 626a, 626b while maintaining the high voltage.

In various embodiments, the high voltage provided to first and second electrodes 626a, 626b may be about 2.5 KV to about 12.5 KV, and more specifically, about 5 KV to about 10 KV. In various embodiments, the current provided to first and second electrodes 626a, 626b may be about 100 µA to about 1 mA, and more specifically, about 250 µA to about 750 µA. By applying a high voltage with a limited current to first and second electrode 626a, 626b, little to no ozone is produced by first and second electrodes 626a, 626b during the air ionizing process. Producing little to no ozone provides increased safety for use in enclosed spaces (e.g., aircraft 100) and is an improvement over existing systems.

There is a first feedback path between current limiter 618 and feedback circuit 620 that provides the voltage and current output of current limiter 618 is provided to feedback circuit 620. In various embodiments, there may be a second feedback path between transformer 610 and feedback circuit 620 that provides the voltage and current output of transformer 610 to feedback circuit 620. Feedback circuit 620 provides the voltage and current output to high voltage controller 612 and controller 622. The feedback provided allows high voltage controller 612 and controller 622 to vary output voltage, output current, and ion count and provide improved performance of system 600.

High voltage controller 612 receives power from converter 608 and is configured to control transformer 610 based on determined operation parameters (e.g., ion count) and feedback received from feedback circuit 620. In various embodiments, regulator 614 may receive power from converter 608 and provide a power supply to controller 622. Controller 622 may communicate with high voltage controller 612 to provide the determined operation parameters (e.g., ion count). In various embodiments, controller 622 may be configured to receive input and provide output for system 600. In various embodiments, controller 622 may send instructions to high voltage controller 612 to change operating parameters.

System 600 further includes an input 628, an output 630, a first communication bus 632, and a second communication bus 634. In various embodiments, input 628 may be a keypad. In various embodiments, input 628 may be a button or a switch. In various embodiments, input 628 may be a touch screen interface. In various embodiments, input 628 may further include an ion probe for detecting the number of ions produced by first and second electrodes 626a, 626b. In various embodiments, output 630 may be a screen, an LED, or light, among others. In various embodiments, input 628 and output 630 may be combined in a touch screen. In various embodiments, first communication bus 632 and second communication bus 634 may be a serial peripheral interface (SPI) bus, a universal asynchronous receiver-transmitter (UART) bus, a controller area network (CAN) bus, or an ethernet connection, among others.

Controller 622 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof. Controller 622 may further comprise memory to store data, executable instructions, system program instructions, and/or controller instructions to implement the control logic of controller 622.

High voltage controller 612 may comprise one or more controllers configured to implement various logical operations in response to execution of instructions, for example, instructions stored on a non-transitory, tangible, computer-readable medium. The one or more controllers can be a voltage switching regulator, a pulse width modulation (PWM) controller, a PWM driver, an application specific integrated circuit (ASIC), discrete or transistor logic, discrete hardware components, or any combination thereof, among others. High voltage controller 612 may further comprise memory to store data, executable instructions, system program instructions, and/or controller instructions to implement the control logic of high voltage controller 612.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

Figure 7:
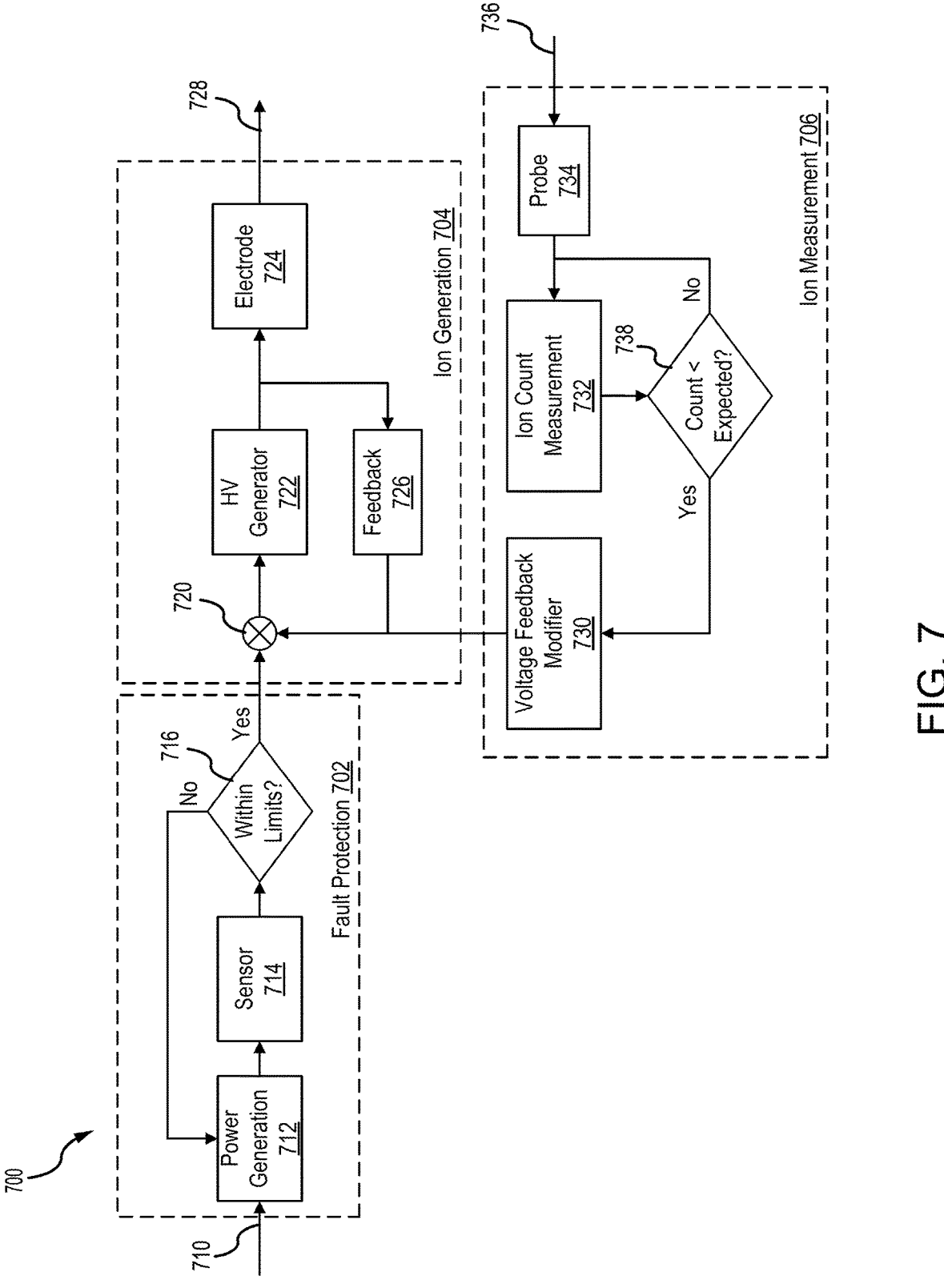
FIG. 7 illustrates a flow diagram of a system for controlling a smart air ionizer, in accordance with various embodiments.

Referring now to FIG. 7, a flow diagram 700 for operating a smart air ionizer is illustrated, in accordance with various embodiments. In various embodiments, flow diagram 700 may be implemented by components of smart air ionizer 510 or system 600 described above with respect to FIGS. 5 and 6, respectively. In various embodiments, the components of smart air ionizer 510 or system 600 may by functionally grouped together and identified in flow diagram 700 as fault protection 702, ion generation 704, and ion measurement 706. It will be appreciated by those of skill in the art that flow diagram 700 illustrated a logical flow of controlling a smart air ionizer (e.g., smart air ionizer 510) and does not necessarily include all components used to perform the logical tasks identified below.

Fault protection 702 includes voltage input 710, power generation 712, sensor 714, and decision block 716. In various embodiments, voltage input 710 and power generation 712 may be implemented by power input 602, protection module 604, active clamp 606, and converter 608 described above with respect to FIG. 6. In various embodiments, sensor 714 may be implemented by one of the components of system 600. In various embodiments, sensor 714 may be a separate component than those describe with respect to system 600. In various embodiments, sensor 714 may measure the voltage and current generated at power generation 712. In various embodiments, sensor 714 may also measure the temperature of the system implementing flow diagram 700 (e.g., system 600).

At decision block 716, system 600 (e.g., controller 622) performs a fault check based on the output of sensor 714.

Controller 622 may check that the operating parameters of system 600 are within predetermined limits. In various embodiments, the operating parameters may include input over voltage, input under voltage, input over current, and/or over temperature, among others. If it is determined that the operating parameters are not within the predetermined limits, controller 622 may shutdown system 600 to protect the circuitry of system 600. If, instead, it is determined that the operating parameters are within the predetermined limits, system 600 functions as described above and further described below.

Ion generation 704 includes combiner 720, high voltage (HV) generator 722, electrode 724, and feedback 726 and generates ions 728. In various embodiments, HV generator 722, electrode 724, and feedback 726 may be implemented by transformer 610, multiplier 616, current limiter 618, feedback circuit 620, and high voltage controller 612 described above with respect to FIG. 6. HV generator 722 may step-up, or multiply, a lower voltage provided to a high voltage and low current for use with electrode 724. The output of HV generator 722 may be regulated by feedback 726. Feedback 726 may compare the output of HV generator 722 (e.g., voltage and current) and compare the output to a programmed value, or threshold. If the output exceeds the threshold, feedback 726 may provide a signal to HV generator 722 to reduce the output voltage.

Electrode 724 generates a number of ions relative to the voltage and current received from HV generator 722. That is, a greater number of ions 728 may be generated by electrode 724 in response to receiving a higher voltage and a lesser number of ions 728 may be generated by electrode 724 in response to receiving a lower voltage. Furthermore, electrode 724 may produce little to no ozone in response to receiving a small current (i.e., less than 1 mA). Feedback 726 provides an indication of the voltage and current output by HV generator 722 to be used in determining whether to alter the output of HV generator 722.

Ion Measurement 706 includes a voltage feedback modifier 730, an ion count measurement 732, and a probe 734 to measure a number of ions 736. In various embodiments, probe 734 measures a number of ions 736 adjacent the smart air ionizer (e.g., smart air ionizer 510). In various embodiments, controller 622 may receive the ion measurement from probe 734 and compare the counted ions to an expected number of ions, or threshold number of ions. At decision block 738, if it is determined that the number of ions 736 counted is less than the expected number of ions, controller 622 signals the voltage feedback modifier 730 to vary the voltage output by HV generator 722. In various embodiments, voltage feedback modifier 730 may also update the programmed voltage value, or threshold, used for comparison by feedback 726. If, instead, it is determined that the number of ions 736 counted meets or exceeds the expected number, controller 622 makes no adjustments to the output of HV generator 722 and continues counting ions. Returning to decision block 738, if instead it is determined that the number of ions 736 is the same or greater than the number of ions expected, method 700 returns to block 732 to continue counting ions.

Figure 8:
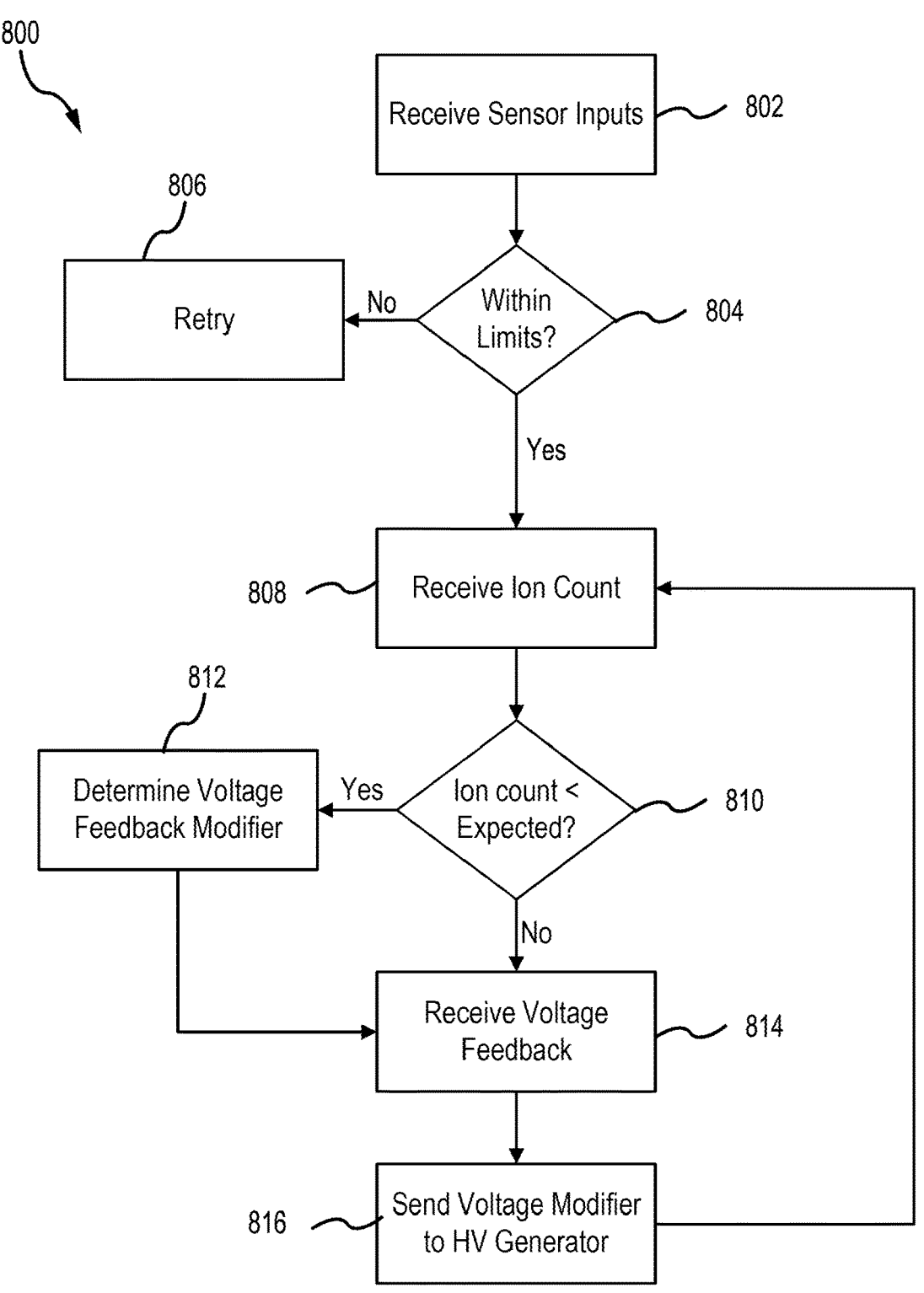
FIG. 8 illustrates a flow diagram of a controller for a smart air ionizer, in accordance with various embodiments.

Referring now to FIG. 8, a method 800 for controlling a smart air ionizer is illustrated, in accordance with various embodiments. In various embodiments, the smart air ionizer may be smart air ionizer 510 or system 600 described above with respect to FIGS. 5 and 6, respectively. In various embodiments, method 800 may be performed by air ionizer circuit 514 or controller 622 described above with respect to FIGS. 5 and 6.

At block 802, controller 622 receives sensor inputs. Sensor inputs may include a voltage input, a current input, and/or a temperature, among others.

At decision block 804, controller 622 determines whether the input voltage is over a first voltage threshold, the input voltage is under a second voltage threshold that is less than the first voltage threshold, the input current is over an current threshold, or the temperature is over a temperature threshold. If it is determined that at least one of the measurements is not within limits, method 800 proceeds to block 806.

At block 806, controller 622 retries the startup of smart air ionizer 510 to protect the circuitry. In various embodiments, controller 622 may restart smart air ionizer 510 instead of retrying startup. In various embodiments, controller 622 may shutdown smart air ionizer 510 instead of retrying startup.

Returning to decision block 804, if it is instead determined that all values are within limit method 800 proceeds to block 808.

At block 808, controller 622 receives an ion count. In various embodiments, the ion count may be received from a probe connected to controller 622. In various embodiments, the ion count may be measured as a total number of ions or as a sample number of ions.

At decision block 810, controller 622 determines whether the number of ions counted is less than an expected number of ions, an ion threshold. If it is determined that the number of ions is less than the number of ions expected, method 800 proceeds to block 812.

At block 812, controller 622 determines a voltage feedback modifier based on the number of counted ions. In various embodiments, the voltage feedback modifier may provide an indication of adjustments to make by a high voltage generator (e.g., HV generator 722) to increase the output voltage to generate more ions.

At block 814, controller 622 receives output voltage feedback from HV generator 722. In various embodiments, controller 622 may use the voltage feedback and/or the voltage feedback modifier to determine an adjustment to make to HV generator 722.

At block 816, controller 622 sends the determined voltage modifier to HV generator 722 to adjust the voltage output and thereby adjust the number of ions produced by smart air ionizer 510. Method 800 then returns to block 808 to continue monitoring the performance of smart air ionizer 510.

Returning to decision block 810, if it is instead determined that the number of ions counted meets or exceeds the number of ions expected, method 800 proceeds to block 814. Method 800 then proceeds as described above.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A smart air ionizer, comprising:
a power circuit;
a high voltage circuit;
an electrode coupled to the high voltage circuit, the electrode being exposed to an airflow to ionize the air in the airflow;
a controller circuit coupled to the power circuit and the high voltage circuit, the controller circuit including a controller configured to control a voltage output of the high voltage circuit to the electrode based on a feedback received from the high voltage circuit; and
an ion probe connected to the controller, wherein the controller is configured to receive an ion count from the ion probe and control the voltage output of the high voltage circuit based on the ion count.

2. The smart air ionizer of claim 1, wherein the feedback includes a voltage feedback, wherein the controller is further configured to determine a voltage modifier based on the voltage feedback.

3. The smart air ionizer of claim 1, wherein the feedback includes a current feedback, wherein the controller is further configured to determine a current modifier based on the current feedback.

4. The smart air ionizer of claim 1, wherein the high voltage circuit further includes a high voltage controller coupled to the controller, wherein the high voltage controller is configured to receive input from the controller and provide output to the switching regulator in response to the received input.

5. The smart air ionizer of claim 1, wherein the controller is further configured to provide the feedback to the power circuit.

6. The smart air ionizer of claim 1, wherein the controller is further configured to receive input from a keyboard interface and provide output to a display.

7. A passenger service unit for use above an airline seat, comprising:
a body;
an air outlet mounted to the body
an electrode mounted adjacent the air outlet, the electrode configured to ionize air surrounding the electrode in response to receiving a high voltage;
an air ionizer circuit connected to the electrode, the air ionizer circuit configured to output the high voltage;
a processor coupled to the air ionizer circuit; and
a memory operatively coupled to the processor, the memory comprising instructions stored thereon that, when executed by the processor, cause the processor to:
receive a voltage feedback from the air ionizer circuit;
determine a voltage modifier based on the voltage feedback; and
send the voltage modifier to adjust the high voltage.

8. The passenger service unit of claim 7, further comprising:
an air duct disposed within the body,
wherein a first end of the air outlet is connected to the air duct and a second end of the air outlet is exposed outside of the body, wherein the electrode is disposed adjacent the first end of the air outlet.

9. The passenger service unit of claim 7, further comprising:
a power circuit connected to the air ionizer circuit; and
a high voltage circuit connected to the air ionizer circuit and the electrode.

10. The passenger service unit of claim 9, wherein the high voltage circuit generates the high voltage and a low current, the high voltage being about 5 KV to about 10 KV, and the low current being less than 1 mA.

11. The passenger service unit of claim 10, further comprising a probe configured to measure a number of ions generated by the electrode, wherein the instructions, when executed by the processor, further cause the processor to:
receive an input from the probe; and
update the voltage modifier in response to the number of ions being below an ion threshold.

12. The passenger service unit of claim 9, wherein the instructions, when executed by the processor, further cause the processor to:
receive a measurement from the power circuit; and
determine to retry startup of the power circuit and the air ionizer circuit in response to the measurement being outside of a predetermined limit.

13. The passenger service unit of claim 7, wherein the instructions, when executed by the processor, further cause the processor to:
receive an indication to change a predetermined high voltage output;
receive feedback including the high voltage; and
adjust the high voltage based on the feedback and the predetermined high voltage output.

14. A method for controlling an air ionizer, comprising:
receiving, by a processor, an ion count from a probe, the ion count being representative of ions produced by an electrode;
comparing, by the processor, the ion count to an ion threshold;
receiving, by the processor, a voltage feedback from a feedback circuit; and
sending, by the processor, a voltage modifier to a high voltage generator, the voltage modifier based on the voltage feedback.

15. The method of claim 14, further comprising:
determining, by the processor, that the ion count is below the ion threshold; and
adjusting, by the processor, the voltage modifier in response to the ion count being below the ion threshold.

16. The method of claim 15, further comprising:
receiving, by the processor, an input to change the ion threshold; and
sending, by the processor, the voltage modifier in response to the change in the ion threshold.

17. The method of claim 16, further comprising:
before receiving the ion count, receiving, by the processor, power sensor inputs; and
determining, by the processor, to continue running in response to the power sensor inputs being within a predetermined voltage limit.

18. The method of claim 14, wherein the sending the voltage modifier results in an increase in a number of ions generated by the electrode.

19. The method of claim 14, wherein the sending the voltage modifier results in a decrease in a number of ions generated by the electrode.

* * * * *